United States Patent [19]

Haag et al.

[11] Patent Number: 4,718,923
[45] Date of Patent: Jan. 12, 1988

[54] DEVICE FOR REMOVING SOLID PARTICLES FROM EXHAUST GAS OF AN INTERNAL COMBUSTION ENGINE

[75] Inventors: Gottlob Haag, Markgröningen; Hubert Dettling, Waiblingen; Rolf Leonhard, Schwieberdingen; Ernst Linder, Mühlacker, all of Fed. Rep. of Germany

[73] Assignee: Robert Bosch GmbH, Stuttgart, Fed. Rep. of Germany

[21] Appl. No.: 810,858

[22] Filed: Dec. 18, 1985

[30] Foreign Application Priority Data

Jan. 8, 1985 [DE] Fed. Rep. of Germany ....... 3500373

[51] Int. Cl.⁴ .............................. B03C 3/06; B03C 3/14
[52] U.S. Cl. ........................................ 55/124; 55/127; 55/146; 55/154; 55/DIG. 38
[58] Field of Search ................... 55/124, 126, 127, 146, 55/154, DIG. 38

[56] References Cited

U.S. PATENT DOCUMENTS

| | | | |
|---|---|---|---|
| 882,509 | 3/1908 | Wood | 55/154 X |
| 1,332,981 | 3/1920 | Gallot et al. | 55/146 |
| 1,440,887 | 1/1923 | Nesbit | 55/127 X |
| 2,708,486 | 5/1955 | Hedberg | 55/124 |
| 3,526,081 | 9/1970 | Kusters | 55/127 |
| 3,765,154 | 10/1973 | Hardt et al. | 55/DIG. 38 X |
| 4,010,011 | 3/1977 | Reif | 55/127 |
| 4,478,613 | 10/1984 | Brettschneider et al. | 55/127 |

FOREIGN PATENT DOCUMENTS

| | | | |
|---|---|---|---|
| 520631 | 1/1956 | Canada | 55/124 |
| 844593 | 7/1952 | Fed. Rep. of Germany | 55/124 |
| 3141156 | 4/1983 | Fed. Rep. of Germany | . |
| 1037701 | 9/1953 | France | 55/126 |
| 20478 | 7/1970 | Japan | 55/124 |
| 181284 | 6/1922 | United Kingdom | 55/146 |
| 533198 | 2/1941 | United Kingdom | 55/DIG. 38 |
| 792588 | 4/1958 | United Kingdom | 55/124 |

*Primary Examiner*—Kathleen J. Prunner
*Attorney, Agent, or Firm*—Michael J. Striker

[57] ABSTRACT

A device for the removal of solid particles, particularly soot particles, from exhaust gas discharged from an internal combustion engine includes an electrofilter comprised of a plurality of parallel filter tubes each having a separator tube connected to a positive terminal of a high voltage source and a corona discharge electrode connected to a negative terminal of the high voltage source, and a centrifugal separator formed as a multi-cyclone the cyclones of which are arranged in an axial extension of the electrofilter and are connected to the same.

12 Claims, 4 Drawing Figures

4,718,923

DEVICE FOR REMOVING SOLID PARTICLES FROM EXHAUST GAS OF AN INTERNAL COMBUSTION ENGINE

BACKGROUND OF THE INVENTION

The present invention relates to a device for the removal of solid particles, particularly soot particles, from exhaust gas leaving an internal combustion engine.

Known soot-removing devices of the type under consideration normally include an electrofilter of the type having a plurality of filter tubes arranged in parallel with each other and including a separator tube and a corona discharge electrode positioned in that tube.

One of the conventional devices of the foregoing type has been disclosed in DE-OS No. 31 41 156. This known device is comprised of a number of individual filter tubes through which soot-loaded exhaust gas flows into a collecting tube, then is deflected by 90° and is fed into a centrifugal separator tangentially to the axis of the housing of said separator. Soot deposited on the walls of the centrifugal separator or cyclone flows with the aid of a very small residual flow of exhaust gas to a place of soot collection whereas a soot-free exhaust gas is discharged from the cyclon via an axial immersion tube. The disadvantage of this device resides in a substantial flow resistance to exhaust gas and resulting pressure reduction.

SUMMARY OF THE INVENTION

It is an object of the present invention to provide an improved device for the removal of solid particles, specifically soot particles, from exhaust gas of an internal combustion engine.

This and other objects of the invention are attained by a device for removing solid particles, particularly soot particles, from exhaust gas of an internal combustion engine, comprising an electrofilter including a plurality of filter tubes positioned parallel to each other and a high voltage source, each filter tube including a separator tube connected to a positive terminal of said high voltage source and a corona discharge electrode axially extended in said separator tube and connected to a negative terminal of said high voltage source; and a centrifugal separator connected to said electrofilter in a direction of an exhaust gas flow, said centrifugal separator being formed as a multi-cyclon and including a plurality of cyclones each having in an axial direction thereof an exhaust gas inlet opening, each of said cylons being immediately connected to a respective filter tube.

The chief advantage of the present invention resides in that due to the provision of a plurality of smaller cyclones and because a substantially axial gas flow is obtained, pressure fall in the device of this invention is much more smaller than that in conventional devices. Because of an axial discharge of the exhaust gas from the filter tubes and an immediate axial feeding of the exhaust gas directly into individual cyclones flanged to the electrofilter soot flakes produced by coagulation in the electrofilter can be advantageously avoided in the centrifugal separator, whereby efficiency of the apparatus is substantially improved. Due to a parallel arrangement of the filter tubes a very compact structure is obtained, which can be formed by modules and adjusted to a respective conduit of the internal combustion engine or combustion motor.

The device may further include a housing closed at two end faces thereof and surrounding said filter tubes so that a hollow space extending approximately over the whole length of said filter tubes is defined between an inner wall of said housing and said filter tubes.

The housing may have an end wall, each separator tube opening towards said end wall and being spaced therefrom; and wherein a cover plate is provided, connected to said housing and closing an end of each separator tube opposite to said end wall, said cover plate having a plurality of through openings spaced from each other and arranged on a circle concentrical to an axis of a respective separator tube, said cyclones being arranged immediately on said cover plate at a side thereof facing away from said separator tubes, said exhaust gas openings overlapping said through openings.

Due to the provision of the housing for the filter tube packages all the filter tubes are enclosed with a sheet housing in which said hollow space is formed, the device can also be used as a muffler.

The cover plate may be positioned in an interior of said housing, each cyclone being flanged to said cover plate and enclosed in said housing.

The housing may have an exhaust gas inlet which opens into said hollow space and an exhaust gas outlet which opens into a housing inner space separated from said hollow space by said cover plate, each cyclone having an exhaust gas outlet opening formed as an immersion tube which opens into said housing inner space.

The exhaust gas inlet may be formed as an inlet connection penetrating into said housing.

In a modified construction the housing may have one end wall, each separator tube opening towards said end wall and being spaced therefrom, and another end wall which closes each separator tube at an end thereof opposite to said one end wall; and wherein a partition is provided near said one end wall, said partition subdividing an interior of said housing into a first inner space which forms said hollow space and a second inner space, said housing having an exhaust gas inlet which opens into said second inner space and an exhaust gas outlet which opens into said first inner space, each cyclone having an exhaust gas outlet opening formed as an immersion tube which opens into said first inner space. The exhaust gas flowing to the multi-cyclone can be easily guided in that hollow space.

The corona discharge electrode may have at each end thereof a high voltage insulator for supporting said electrode in said housing, the corona discharge electrode arranged at a closed end of each separator tube being provided with a protective hood surrounding said electrode. Therefore each corona discharge electrode is protected against damage due to crushed rock or the like.

In the exhaust gas inlet openings of each cyclone an air guide element may be provided for producing a helically formed gas flow, the guide element may be formed as a guide vane or whirl vane.

Due to the provision of the protective hood on each corona discharge electrode depositing of soot and other solid particles on the high voltage insulator is avoided, which results in improved functioning of the electrofilter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
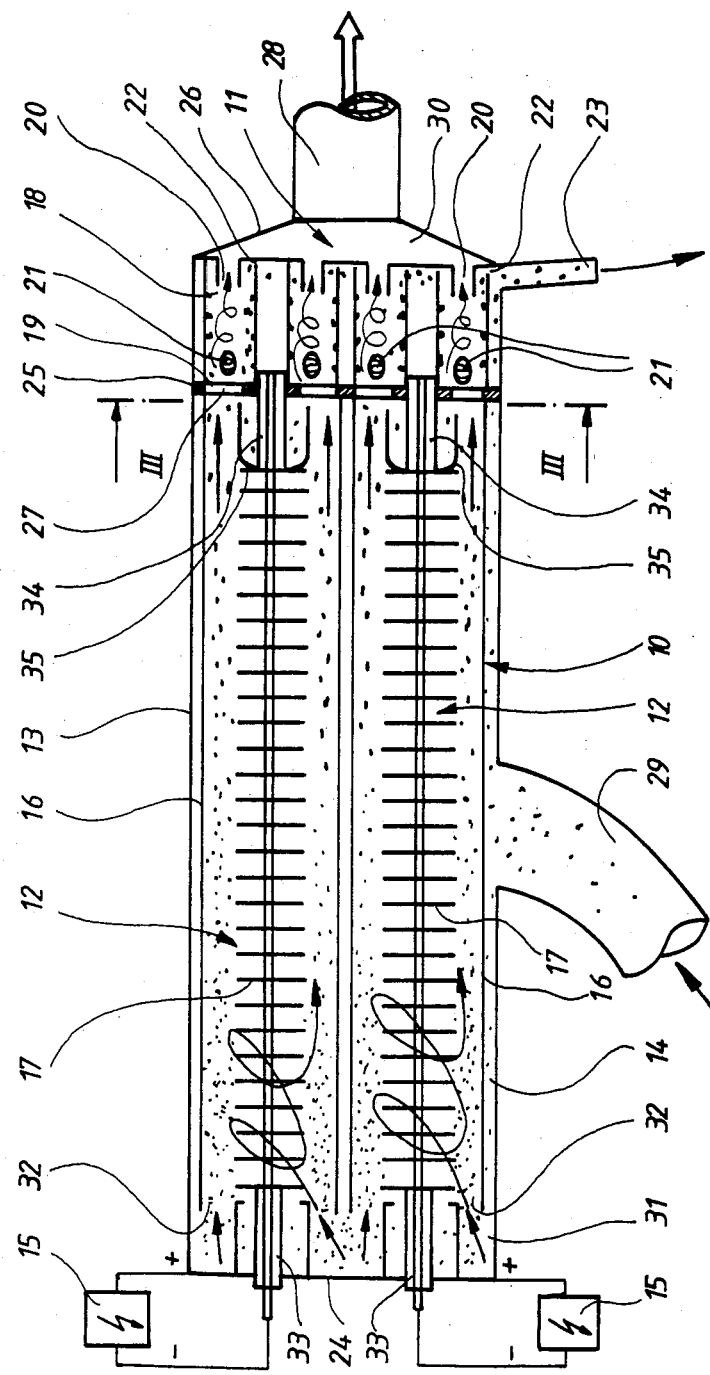
FIG. 1 is a schematic axial view of the device for removing solid particles from exhaust gas of a combustion motor according to a first embodiment of the invention.
Figure 3:
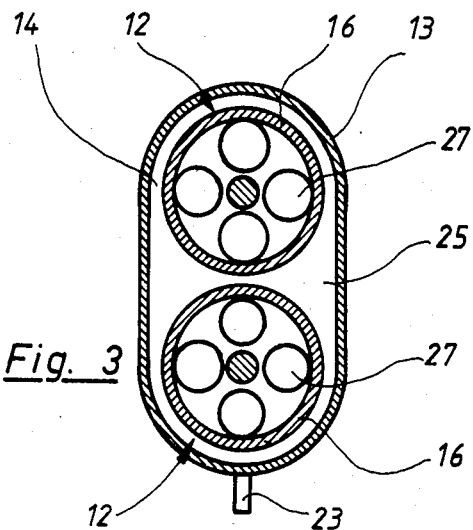
FIG. 3 is a sectional view taken along line III—III of FIG. 1.

Referring now to the drawings in detail, the device shown in FIG. 1 is used for the removal of solid particles, for example soot particles, from exhaust gas of an internal combustion engine, particularly a combustion motor of a vehicle. The device is comprised of an electrofilter 10 and a centrifugal separator 11 connected to the electrofilter. The electrofilter 10 includes in the known fashion a number, here two, of filter tubes 12 extending parallel to each other. The tubes are surrounded with a tubular housing 13 closed at two end faces thereof, whereby a hollow space or chamber 14 is defined between the inner surface of the housing and the filter tubes 12, extending approximately over the whole length of the filter tubes. This chamber 14 is also shown in FIG. 3. Each filter tube 12 has in the known fashion a separator tube 16 connected with a positive terminal of a high voltage source 15 and a corona discharge electrode 17 connected to a negative terminal of the high voltage source 15. The structure and mode of operation of individual filter tubes 12 of the electrofilter 10 is known and has been disclosed, for example in DE-OS No. 31 41 156.

The centrifugal separator 11 is formed as a multi-cyclone provided with a plurality of small axial cyclones. Axial cyclones 18, the number of which in the exemplified embodiment is four, are connected immediately to the filter tubes 12. Each axial cyclone 18 has an axial inlet opening 19 and an outlet opening 20 opposing the inlet opening and extended into the interior of the axial cyclone 18 as a frustoconical immersion tube for cleaned exhaust gas.

Centrally of the inlet opening 19 is arranged an air conducting element 21 positioned immediately behind the inlet opening and formed as a baffle plate or a finned wing. The air guiding element 21 transfers the exhaust gas flow entering through the inlet opening 19 of the axial cyclone 18 into a helically directed flow. A radially extended soot outlet 22 is provided laterally at the closed end of the axial cyclone 18, soot outlet 22 being positioned at the side opposite to the inlet opening 19. Soot-loaded exhaust gas flow which makes a total of about 1% of the exhaust gas entering the axial cyclone 18 is discharged through the soot outlet 22 and leaves the device via a soot collecting conduit 23.

The separator tube 16 of each filter tube 12 is open at its one end, which is positioned at a distance from the end wall 24 of the housing 13, while the other end of each separator tube is closed with a cover plate 25. The latter is secured in the housing 13 at a distance from the end wall 26 of the housing 13. The cover plate 25 has, as shown in FIG. 3, a number of through openings 27 arranged at a distance from each other on a circle concentric with the axis of the filter tube 12.

The axial cyclones 18 are flanged immediately on the cover plate 25 at the side thereof facing away from the filter tubes 12 so that exhaust gas inlet openings 19 overlap the through openings 27. The axial cyclones 18 are integrated in the housing 13 whereby their outlet openings 20 freely open into a housing interior 30 separated from the portion of the housing 13 accommodating filter tubes 12 by the cover plate 25; the cleaned gas discharged from the axial cyclones 18 is fed from the inner space 30 through an exhaust gas collecting conduit 28 formed on the end wall 26 of the housing 13.

An inner housing space 31 separated by the cover plate 25 opens into an exhaust gas feeding conduit 29 formed laterally of the housing 13. Feeding conduit 29 is connected immediately with a non-shown exhaust gas collecting system of a combustion motor. Exhaust gas fed through the exhaust gas feeding conduit 29 into the hollow space 14 can enter, through the open ends of the separators 16 and then through available ring-shaped inlet openings 32, both filter tubes 12. The exhaust gas passes then through the guiding vanes of the filter tubes 12 and forms a spiral or helical flow. The high voltage field applied to the filter tubes 12 in the known fashion causes a soot coagulation whereby large soot flocks are formed, which enter with the exhaust gas the axial cyclones 18 and there are separated from each other. During the separation a soft soot passes through the soot collecting conduit and is eventually fed back to or collected in or burned in the combustion motor while the cleaned exhaust gas is discharged outside through the exhaust gas collecting conduit 28.

It should be noted that in each filter tube 12 the corona discharge electrode 17 at both ends is held by high voltage insulators 33, 34 in the respective separator tube 16. In order to prevent depositing of soot flocks produced by coagulation in the filter tubes on the insulator 34 arranged at the end of each filter tube this insulator 34 is surrounded by a protective hood 35. This cup-shaped protective hood 35 is set on the end side of the high voltage insulator 34 facing the corona discharge electrode 17 and encloses the same near the end of the separator tube 16.

Figure 2:
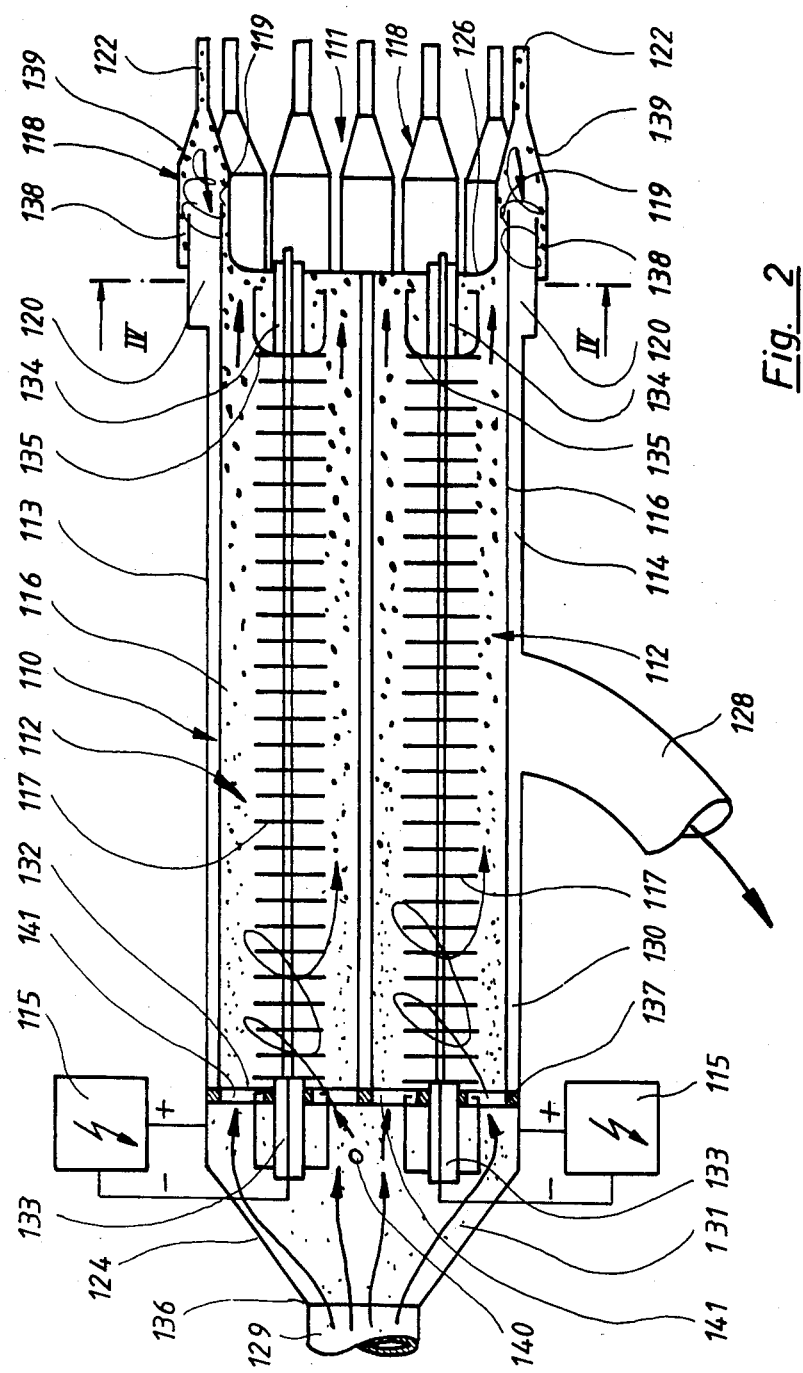
FIG. 2 is a schematic axial view of the device for removing solid particles according to a second embodiment of the invention.
Figure 4:
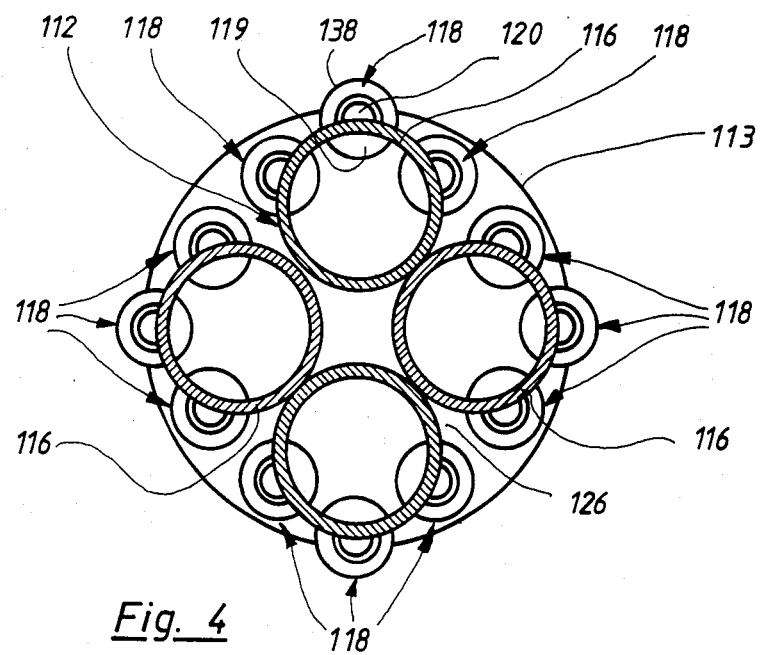
FIG. 4 is a sectional view taken along line IV—IV of FIG. 2.

In the embodiment of FIGS. 2 and 4, the device for the removal of exhaust gas has an electrofilter 110 which includes four filter tubes 112. All filter tubes 112 are identical to the filter tubes 12 of the embodiment of FIGS. 1, 3.

The filter tube package is enclosed in a housing 113 which is closed at its end faces 124 and 126. Housing 113 has at its one end wall 124 an exhaust gas inlet 136 at which an exhaust gas feeding conduit 129 leading to an exhaust gas collecting system of the combustion motor is connected. An exhaust gas collecting conduit 128 for collecting cleaned exhaust gas discharged from the housing 113 is arranged laterally of and opens into the housing 113. The conduit 128 is in connection with a hollow space or chamber 114 defined between the wall of the housing 113 and the filter tube package. Corona discharge electrodes 117 are supported in the respective filter tubes 112 by high voltage insulators 133, 134 of the separator tubes 116 whereby each high voltage insulator 134 positioned in the direction of the exhaust gas flow at the end of the respective filter tube is surrounded with a protective hood 135.

Reference numeral 115 designates a high voltage source similarly to FIG. 1.

Near the front ends of the filter tubes 112 in the direction of the exhaust gas flow, a separating wall or partition 137 is provided in the housing 113. This partition subdivides the whole inner space of the housing into a housing inner space 131 having the exhaust gas inlet opening 136 and a housing inner space 130 accommodating filter tubes 112. The exhaust gas collecting conduit 128 extends outwardly from the inner space 130. The partition 137 has annular through openings 141 which form ring-shaped passages for the exhaust gas flowing through the feeding conduit 129 into the filter tubes 112.

A centrifugal separator 111, also formed as a multi-cyclone, includes a number of cyclones 118 and is provided with an axial inlet opening 119 for exhaust gas leaving the filter tubes. Three cyclones 118 correspond to each filter tube 112. Cyclones 118 are immediately connected to the end of the respective separator tube 116 as shown in FIG. 4. Each cyclone 118 has a cylindrical housing portion 138 and a conical housing portion 139 connected to the cylindrical housing portion 138 and opening into a soot outlet connection. An outlet opening 120 for the cleaned gas is formed as an immersion tube extended coaxially into the cylindrical housing portion. This outlet opening formed by the immersion tube opens into the hollow space 114 of the housing 113.

In the embodiment illustrated in FIGS. 2 and 4, the exhaust gas flowing axially through the inlet opening 136 in the end housing wall 124 from the combustion motor enters openings 132 of the filter tubes 112 through the annular through openings 141 in partition 137 and by means of guide vanes 140 is formed into a flow moved in a helical path. A known soot coagulation takes place in the filter tubes 112, whereby greater soot particles are collected in the separator tubes 116 and from thence are directed with the exhaust gas into the cyclones 118. Soot particles are divided off at the walls of the cyclones and move together with a very small exhaust gas flow to the soot outlet connections 122. The cleaned exhaust gas, which makes a total of about 99% of the amount of the exhaust gas flowing through the inlet opening of each cyclone, flows through the immersion tube or outlet opening 120 into the housing inner space 130 and from there into atmosphere through the conduit 128. Soot discharged from the connections 122 can be collected and burned out in the combustion motor.

It will be understood that each of the elements described above, or two or more together, may also find a useful application in other types of devices for removing solid particles from exhaust gas of internal combustion engines differing from the types described above.

While the invention has been illustrated and described as embodied in a device for the removal of solid particles, particularly soot particles from exhaust gas of an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for removing solid particles, particularly soot particles, from exhaust gas of an internal combustion engine, comprising an electrofilter including a plurality of filter tubes positioned parallel to each other, and a high voltage source, each filter tube including a separator tube connected to a positive terminal of said high voltage source and a corona discharge electrode axially extended in said separator tube and connected to a negative terminal of said high voltage source; a housing surrounding said filter tubes so that a hollow space extending approximately over the whole length of said filter tubes is defined between an inner surface of said housing and said filter tubes; and a centrifugal separator connected to said electrofilter in a direction of an exhaust gas flow, said centrifugal separator being formed as a multi-cyclone and including a plurality of cyclones arranged so that a number of cyclones correspond to each separator tube, each cyclone having in an axial direction thereof an exhaust gas inlet opening, each separator tube being immediately connected to said number of cyclones which are arranged on a circle concentrical to an axis of a respective separator tube.

2. The device as defined in claim 1, wherein said housing has an end wall, each separator tube opening towards said end wall and being spaced therefrom; and wherein a cover plate is provided, connected to said housing and closing an end of each separator tube opposite to said end wall, said cover plate having a plurality of through openings spaced from each other and arranged on a circle concentrical to an axis of a respective separator tube, said cyclones being arranged immediately on said cover plate at a side thereof facing away from said separator tubes, said exhaust gas inlet openings overlapping said through openings.

3. The device as defined in claim 2, wherein said cover plate is positioned in an interior of said housing, each cyclone being connected to said cover plate and enclosed in said housing.

4. The device as defined in claim 3, wherein said housing has an exhaust gas inlet which opens into said hollow space and an exhaust gas outlet which opens into a housing inner space separated from said hollow space by said cover plate, each cyclone having an exhaust gas outlet opening formed as an immersion tube which opens into said housing inner space.

5. The device as defined in claim 4, wherein said exhaust gas inlet is formed as an inlet connection penetrating said housing.

6. The device as defined in claim 1, wherein said housing has one end wall and another end wall opposite to said one end wall; and wherein a partition is provided near said one end wall, said partition subdividing an interior of said housing into a first inner space which forms said hollow space and a second inner space, said housing having an exhaust gas inlet which opens into said second inner space and an exhaust gas outlet which opens into said first inner space, said partition having through openings connecting said second inner space with said separator tubes, each cyclone having an exhaust gas outlet opening formed as an immersion tube which opens into said first inner space.

7. The device as defined in claim 6, wherein said exhaust gas outlet is formed as an outlet connection penetrating said housing.

8. The device as defined in claim 7, wherein said exhaust gas inlet is formed by an inlet connection at said one end wall and being coaxial to an axis of said housing.

9. The device as defined in claim 1, wherein the corona discharge electrode has at least at one end thereof a high voltage insulator for supporting said electrode in said housing, said high voltage insulator being provided with a protective hood.

10. The device as defined in claim 1, wherein each cyclone includes an air guide element positioned immediately behind said exhaust gas inlet opening as viewed in the direction of an exhaust gas flow and formed so as to transfer the exhaust gas flow entering said inlet opening into a helically formed gas flow.

11. The device as defined in claim 10, wherein said guide element is a guide vane.

12. A device for removing solid particles, particularly soot particles, from exhaust gas of an internal combustion engine, comprising an electrofilter including a plurality of filter tubes positioned parallel to each other, and a high voltage source, each filter tube including a separator tube connected to a positive terminal of said high voltage source and a corona discharge electrode axially extended in said separator tube and connected to a negative terminal of said high voltage source; a housing surrounding said filter tubes so that a hollow space extending approximately over the whole length of said filter tubes is defined between an inner surface of said housing and said filter tubes; and a centrifugal separator connected to said electrofilter in a direction of an exhaust gas flow, said centrifugal separator being formed as a multi-cyclone and including a plurality of cyclones arranged so that a number of cyclones correspond to each separator tube, each cyclone having in an axial direction thereof an exhaust gas inlet opening, each separator tube being immediately connected to said number of cyclones which are arranged on a circle concentrical to an axis of a respective separator tube, said housing having an end wall, each separator tube opening towards said end wall and being spaced therefrom; and wherein a cover plate is provided, connected to said housing and closing an end of each separator tube opposite to said end wall, said cover plate having a plurality of through openings spaced from each other and arranged on a circle concentrical to an axis of a respective separator tube, said cyclones being arranged immediately on said cover plate at a side thereof facing away from said separator tubes, said exhaust gas inlet openings overlapping said through openings; said cover plate being positioned in an interior of said housing, each cyclone being connected to said cover plate and enclosed in said housing, said housing having an exhaust gas inlet which opens into said hollow space and an exhaust gas outlet which opens into a housing inner space separated from said hollow space by said cover plate, each cyclone having an outlet opening formed as an immersion tube extended into an interior of a respective cyclone.

* * * * *